United States Patent [19]

Del Vecchio et al.

[11] Patent Number: 4,639,610

[45] Date of Patent: Jan. 27, 1987

[54] ROTATING FLUX TRANSFORMER

[75] Inventors: Robert M. Del Vecchio, Sunnyvale, Calif.; Theodore R. Specht, Sharon, Pa.

[73] Assignee: Westinghouse Electric Corp., Pittsburgh, Pa.

[21] Appl. No.: 807,147

[22] Filed: Dec. 10, 1985

[51] Int. Cl.[4] ........................ H02J 1/00; H01H 85/02

[52] U.S. Cl. ........................ 307/83; 307/415; 307/106; 336/229; 336/5; 336/10; 336/12; 323/215; 323/250; 323/251; 363/154

[58] Field of Search ................. 307/83, 106, 412, 413, 307/414, 415, 416, 417, 418, 419, 420, 421, 422; 336/220, 221, 225, 229, 206, 208, 184, 155, 130, 233, 234, 178, 195, 5, 10, 12; 376/128, 140, 135, 142, 134, 146, 136, 132, 133, 130; 363/154; 323/215, 200, 251, 301, 332, 331, 355, 305, 328, 329

[56] References Cited

U.S. PATENT DOCUMENTS

| | | | |
|---|---|---|---|
| 2,130,508 | 9/1938 | Peterson | 336/229 X |
| 2,452,901 | 11/1948 | Camilli | 336/229 X |
| 2,498,747 | 2/1950 | Wiegand | 336/215 X |
| 2,702,887 | 2/1955 | Joublanc | 336/215 X |
| 2,870,397 | 1/1959 | Kelley | 336/215 X |
| 2,907,894 | 10/1959 | Bonn | 307/88 |
| 2,975,357 | 3/1961 | Manning | 336/12 X |
| 3,004,171 | 10/1961 | Lipkin | 307/415 |
| 3,087,108 | 4/1963 | Toffolo et al. | 336/215 X |
| 3,671,901 | 6/1972 | Lys | 336/5 |
| 3,717,808 | 2/1973 | Horna | 323/305 |
| 3,757,201 | 9/1973 | Cornwell | 323/250 |
| 4,087,322 | 5/1978 | Marcus | 376/142 X |
| 4,205,288 | 5/1980 | Lin et al. | 336/233 X |
| 4,213,084 | 7/1980 | Hiromitsu | 323/250 |
| 4,551,700 | 11/1985 | Waldemar | 336/192 |
| 4,595,843 | 6/1986 | DelVecchio et al. | 336/195 X |

FOREIGN PATENT DOCUMENTS 213236 6/1956 Australia .

*Primary Examiner*—Bernard Roskoski
*Assistant Examiner*—Shik Luen Paul Ip
*Attorney, Agent, or Firm*—D. R. Lackey

[57] ABSTRACT

A rotating flux transformer having at least two magnetic cores, each in the form of a torus, with each magnetic core having poloidal and toroidal windings. The need for breaking the torus and bringing out leads from the poloidal winding is eliminated by passing each torus through the core window of the remaining torus, or tori. Each poloidal winding is shorted, with the toroidal winding, or windings, of the other magnetic core or cores, inducing an excitation voltage into each shorted poloidal winding which is 90° out of phase with the voltage applied to the toroidal winding on the same magnetic core.

17 Claims, 12 Drawing Figures

ROTATING FLUX TRANSFORMER

BACKGROUND OF THE INVENTION

1. Field of the Invention

The invention relates in general to electrical transformers, and more specifically to electrical transformers in which the vector sum of the magnetic flux produced in the magnetic core creates a rotating induction vector.

2. Description of the Prior Art

Co-pending application Ser. No. 607,852, filed May 7, 1984, entitled "Low Core Loss Rotating Flux Transformer", which is assigned to the same assignee as the present application, discloses a transformer construction in which a rotating induction vector is produced in the entire magnetic core. The magnetic core is in the form of a torus, with both toroidal and poloidal windings generating phase displaced alternating flux which is added vectorially to create the rotating induction vector. By providing sufficient exciting current to produce a saturated rotating induction vector, hysteresis losses are reduced to zero. When the magnetic core is constructed of an amorphous alloy, which is nominally about 1 mil thick, a magnetic core with unusually low core losses is produced, as the magnetic domains of a magnetic material disappear at saturation, further reducing the already low eddy current losses of an amorphous magnetic core. Application Ser. No. 607,852 is hereby incorporated into the specification of the present application by reference.

SUMMARY OF THE INVENTION

Briefly, the present invention is a new and improved rotating flux transformer which utilizes at least two mutually intersecting tori. Each torus magnetic core includes poloidal and toroidal windings, with each magnetic core passing through the opening of the remaining magnetic core, or cores. Each poloidal winding includes shorted turns. A voltage is induced into each shorted poloidal winding by the toroidal winding of the intersecting torus, or tori. Thus, the invention eliminates the need of bringing leads out from the poloidal windings.

Alternating voltages having predetermined phase differences are applied to the toroidal windings, such that the induced poloidal voltage in each poloidal winding is 90° out of phase with the toroidal voltage of the same magnetic core. The excitation currents provided in the poloidal and toroidal windings of each magnetic core are tailored to produce a saturated rotating induction vector. The poloidal windings only provide excitation current. Load currents are provided only by the easily cooled toroidal windings.

In a two tori embodiment, the voltages applied to the two toroidal primary windings are 90° out of phase. Toroidal secondary windings produce a two-phase output, which may be converted to a three-phase output by using the two-to-three phase Scott connection.

In a three tori embodiment, a three-phase voltage source is utilized, i.e., the three primary voltages applied to the three toroidal primary windings are 120 electrical degrees apart, and the output voltage provided by the toroidal secondary windings is also three-phase. The 90° phase difference required to produce the rotating induction vector in each torus core, is developed from the other two-phase voltages.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF PREFERRED EMBODIMENTS

Figure 1:
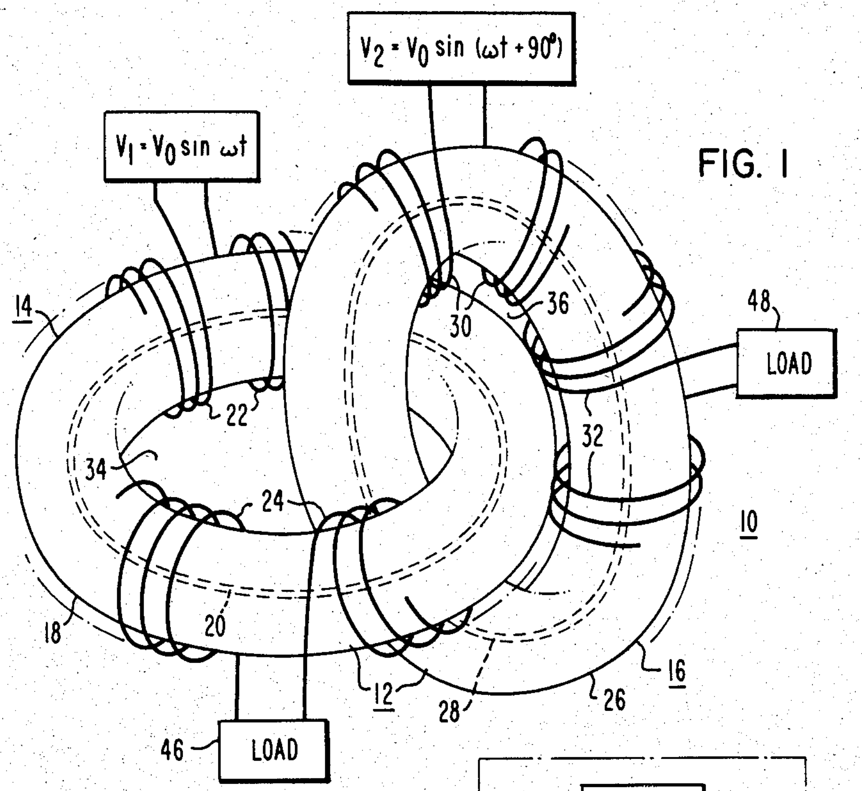
FIG. 1 is a perspective view of a core-coil assembly of a rotating flux transformer constructed according to the teachings of the invention.
Figure 2:
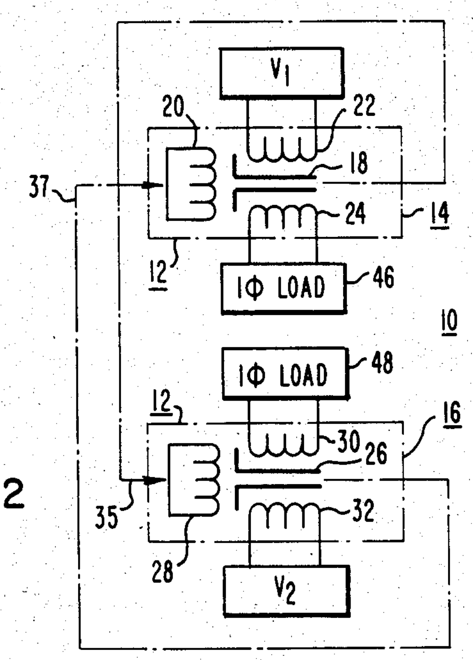
FIG. 2 is a schematic diagram of the rotating flux transformer shown in FIG. 1.

Referring now to the drawings, and to FIGS. 1 and 2 in particular, there is shown a perspective view and a schematic diagram, respectively, of a rotating flux transformer 10 constructed according to a first embodiment of the invention. Transformer 10 comprises a core-coil assembly 12 which includes first and second tori 14 and 16, respectively. The first torus 14 includes a magnetic core 18 in the form of a torus, a poloidal winding 20, a toroidal primary winding 22, and a toroidal secondary winding 24. In like manner, the second torus 16 includes a magnetic core 26 in the form of a torus, a poloidal winding 28, a toroidal primary winding 30 and a toroidal secondary winding 32.

In order to eliminate the need for electrical leads on the poloidal windings 20 and 28, each poloidal winding is shorted, and an excitation voltage is induced into each poloidal winding by constructing tori 14 and 16 to intersect one another. In other words, tori 14 and 16 have core openings or windows 34 and 36, respectively, with the first torus 14 linking window 36 of the second torus 16, and with the second torus 16 linking the window 34 of the first torus 14. Thus, while the poloidal and toroidal windings of the same torus are non-inductive, the toroidal primary winding of one torus is in inductive relation with the poloidal winding of the other torus, and a voltage will thus be induced into each poloidal winding. Broken lines 35 and 37 in FIG. 2 indicate the inductive links between tori 14 and 16.

In order to generate magnetic flux in each magnetic core which, when added vectorially, will produce a rotating induction vector, the fluxes produced by the poloidal winding and toroidal primary winding of a torus must be about 90 electrical degrees out of phase. The desired result may thus be achieved by connecting toroidal primary windings 22 and 32 of tori 14 and 16, respectively, to sources $V_1$ and $V_2$, respectively, of alternating potential. Source $V_1$ is a sine wave of a predetermined frequency, represented by $V_0 \sin \omega t$ and $V_2$ is a sine wave of like frequency represented by $V_0 \sin (\omega t + 90°)$. The predetermined frequency may be 60 Hertz, for example. Thus, the magnetic fluxes produced in magnetic cores 18 and 26 by their associated toroidal and poloidal windings will be 90° out of phase, producing a rotating induction vector.

In order to achieve the objective of reducing core losses, however, it is not sufficient that the resulting induction vector rotate. The excitation current produced by the associated poloidal and toroidal windings must produce a saturated rotating induction vector, in order to eliminate hysteresis losses. Both flux components produced by the poloidal and toroidal windings must saturate their associated core areas in order to produce a saturated rotating induction vector. If the magnetic core, such as magnetic core 18 of the first torus 14, were to have a single axially extending central opening with a shorted poloidal winding comprising a single shorted coil of one or more turns, the flux induced by the poloidal winding will not be sufficient to saturate the associated flux carrying volume of the magnetic core. This is due to the fact that the flux carrying volume associated with the poloidal winding is larger than the flux carrying volume associated with the toroidal primary winding, for reasonably configured tori. The induced poloidal winding current generates flux in the associated magnetic core which is opposite to the driving flux. This opposing flux must thus be sufficient to saturate the associated core volume, and the driving flux must be of sufficient strength to exceed the saturating opposing flux. Since the flux carrying volume associated with the poloidal winding exceeds the flux carrying volume associated with the toroidal primary winding, at saturation the induced flux would have to be greater than the driving flux, which is not possible. This problem is overcome by the teachings of the invention, as shown in FIG. 3.

Figure 3:
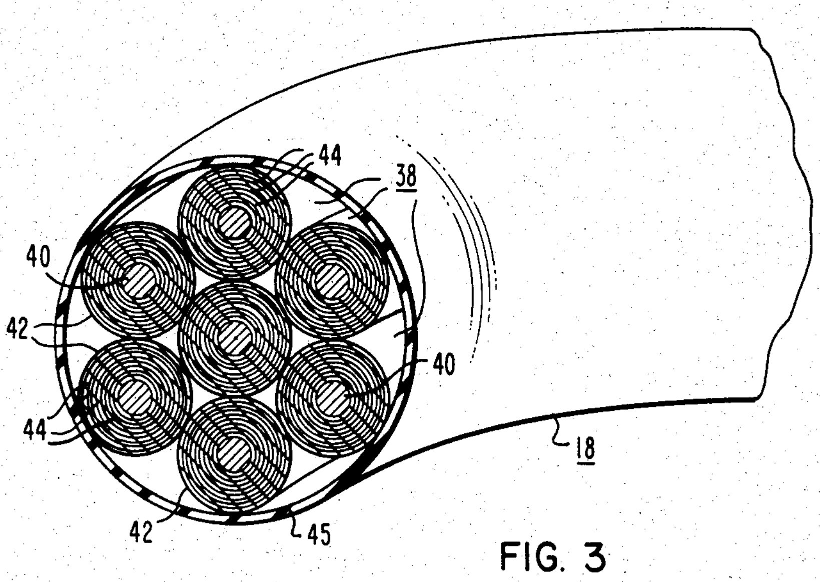
FIG. 3 is a fragmentary, perspective view, in section, of one of the magnetic cores shown in FIG. 1.

More specifically, FIG. 3 is a fragmentary, perspective view, in section, of one of the magnetic cores 18 or 26, such as magnetic core 18, for example. Both magnetic cores 18 and 26 are of like construction. The torus is subdivided into a plurality of subtori 38. Each subtorus 38 includes a central coil 40 comprising one or more shorted turns of electrical conductor, such as copper or aluminum, for example. Each central coil 40 is surrounded by a magnetic core 42. As illustrated, each magnetic core 42 may have a plurality of core wraps or laminations 44 of a suitable magnetic material. In a preferred embodiment of the invention, laminations 42 are formed of an amorphous alloy. However, other magnetic materials may be used, such as the ferrites. If magnetic core 42 is constructed of an amorphous alloy, a strip of amorphous alloy, which is typically about 1 mil thick, and 4 to 6 inches wide, may be spirally wound about a preformed poloidal coil 40, with the winding proceeding about the shorted coil loop until the desired core build is achieved.

With the subcore arrangement shown in FIG. 3, the flux induced into each subcore 42 opposes the driving flux for only itself, and does not affect the other subcores 42. The volume of each subcore 42 is thus selected for the excitation which will be provided by each coil 40, enabling each subcore 42 to saturate due to the induced current in its associated shorted coil 40. The subcores 42 may be held in assembled relation by any suitable outer wrap 45, which may provide the ground insulation about which the toroidal windings may be wound.

The toroidal secondary windings 24 and 32 may each be connected to a separate load circuit 46 and 48, respectively, i.e., to single phase loads; or, they may be connected to a two-phase load, as desired. It is also practical to construct the toroidal secondary windings 24 and 32 with 50% and 86.6% taps, and connect the tori 14 and 16 as main and teaser transformers, respectively, in the Scott two-phase to three-phase configuration. Tori 14 and 16 may also be specifically constructed as main and teaser transformers, if desired, requiring only a center tap on the secondary winding of the main transformer.

Figure 4:
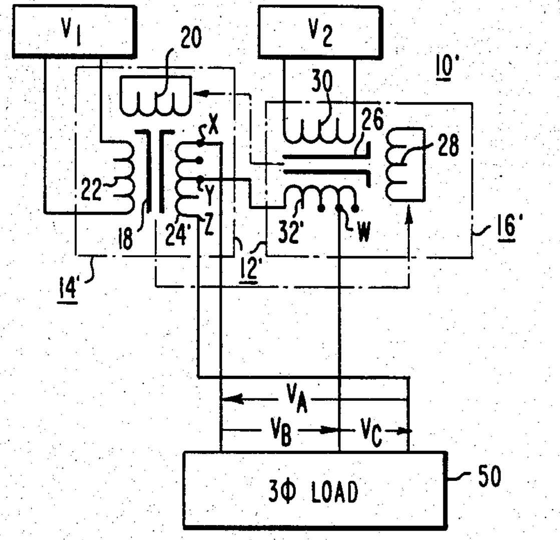
FIG. 4 is a schematic diagram illustrating a two-to-three phase embodiment of the transformer shown in FIG. 1.

A transformer arrangement using two similar tori with 50% and 86.6% taps on each toroidal secondary winding, is shown in FIG. 4, which is a schematic diagram of a transformer 10'. Transformer 10' provides a three-phase output $V_A$, $V_B$ and $V_C$ from the 90° phase displaced primary or input voltages $V_1$ and $V_2$. Output voltages $V_A$, $V_B$ and $V_C$ may be connected to a three-phase load 50. Components in FIG. 4 which are the same as those shown in FIGS. 1 and 2 are given like reference numerals and will not be described again. Components in FIG. 4 which are similar to those of FIG. 1 except modified in some way, are given the same reference numeral along with a prime mark.

Figure 5A:
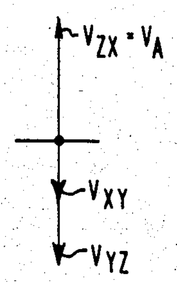
FIGS. 5A, 5B and 5C are phasor diagrams which illustrate how the three output phases of the FIG. 4 embodiment are generated.
Figure 5B:
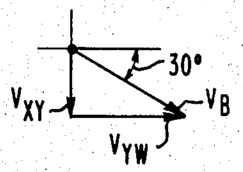
Figure 5C:
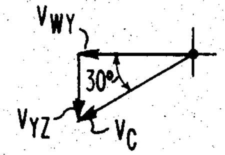
Figure 7:
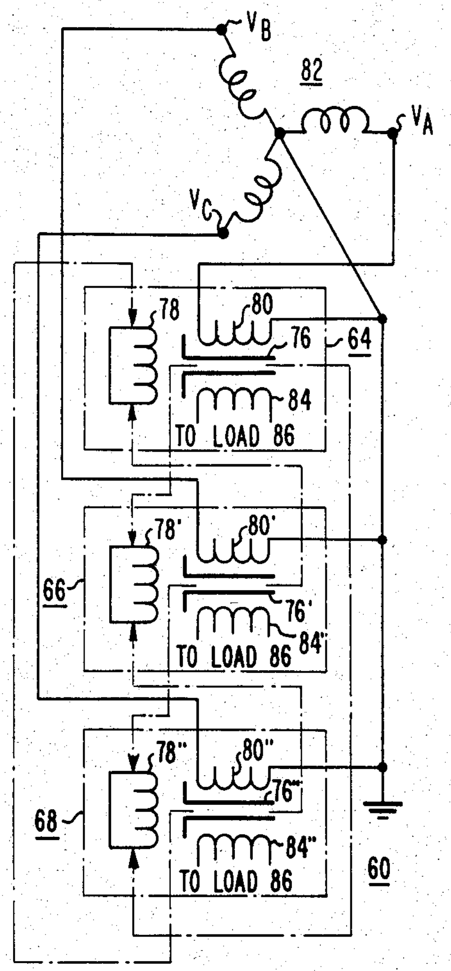
FIG. 7 is a schematic diagram of the rotating flux transformer shown in FIG. 6.

More specifically, transformer 10' includes a first torus 14' which has a toroidal secondary winding 24' having ends x and z and a center tap y. Transformer 10' also includes a second torus 16' which has a toroidal secondary winding 32' having one end connected to the center tap y on winding 24', and an 86.6% tap w. voltage $V_A$ is the potential of x with respect to z ($V_{zx}$); voltage $V_B$ is the potential of $\omega$ with respect to x ($V_{xw}$); and voltage $V_C$ is the potential of z with respect to $\omega$ ($V_{wz}$). FIG. 5A is a phasor diagram which illustrates voltage $V_A$ being produced by the vector summation of voltages $V_{xy}$ and $V_{yz}$. FIG. 5B is a phasor diagram which illustrates voltage $V_B$ being produced by the vector summation of voltages $V_{yw}$ and $V_{xy}$, which voltages are 90° out of phase. FIG. 5C is a phasor diagram which illustrates voltage $V_C$ being produced by the vector summation of voltages $V_{yz}$ and $V_{wy}$, which voltages are 90° out of phase. Since voltage $C_{xy}$ is 50% of the total secondary voltage, and voltages $V_{yw}$ and $V_{wy}$ are each 86.6% of the total secondary voltage, voltage $V_B$ lags $V_A$ by 120°, and voltage $V_C$ leads voltage $V_A$ by 120°.

Figure 6:
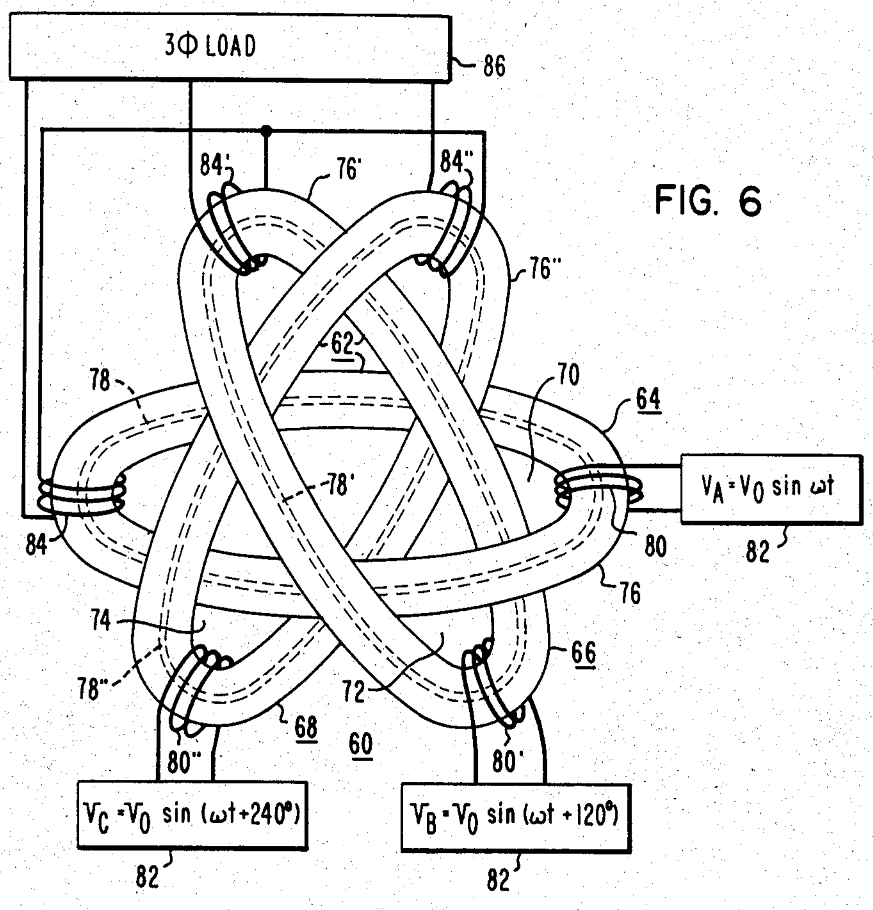
FIG. 6 is a perspective view of a core-coil assembly of a rotating flux transformer constructed according to another embodiment of the invention.

FIG. 6 is a perspective view of a transformer 60 which is a true three-phase embodiment of the invention. Transformer 60 includes a core-coil assembly 62 which includes first, second and third mutually intersecting tori 64, 66 and 68. In other words, tori 64, 66 and 68 have core windows 70, 72 and 74, respectively, with torus 64 linking tori 66 and 68 via their windows 72 and 74, torus 66 linking tori 64 and 68 via their windows 70 and 74, and torus 68 linking tori 64 and 66 via their windows 70 and 72. Torus 64 includes a magnetic core 76 which is constructed of a plurality of subtori, as shown in FIG. 3, a shorted poloidal winding 78, a toroidal primary winding 80 connected to voltage $V_A$ of a three-phase source 82, such as the secondary winding of a three-phase transformer, and a toroidal secondary winding 84. Tori 66 and 68 are constructed in the same manner as torus 64, and like reference numerals are used to identify like components, except for the addition of a single prime mark relative to torus 66, and a double prime mark relative to torus 68. The three toroidal primary windings 80, 80' and 80'' are connected to a three-phase voltage represented by voltages $V_A$, $V_B$ and $V_C$. If voltage $V_A$ is a sine wave equal to $V_o \sin \omega t$, voltage $V_B$ may be represented by $\sin (\omega t+120°)$ and voltage $V_C$ may be represented by $V_o \sin (\omega t+240°)$. The toroidal secondary windings 84, 84' and 84'' are connected to a three-phase load 86.

Figure 8A:
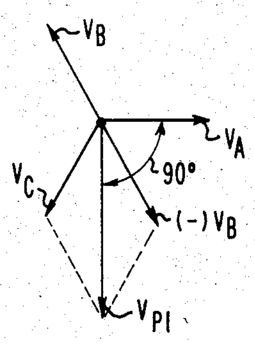
FIGS. 8A, 8B and 8C are phasor diagrams which illustrate how the induced voltages in the poloidal windings are generated to provide the desired 90° phase shift relative to the voltage applied to the toroidal primary winding on the same magnetic core.
Figure 8B:
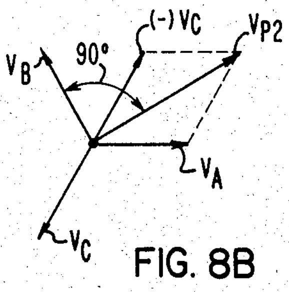
Figure 8C:
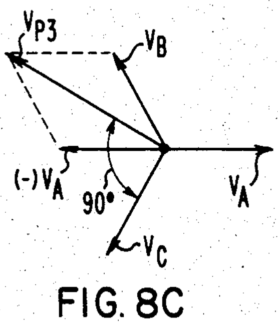

Tori 64, 66 and 68 are linked such that the voltage induced in each poloidal winding is 90° out of phase with the voltage applied to the toroidal primary winding on the same magnetic core. FIG. 8A is a phasor diagram which illustrates the induced poloidal voltage $V_{P1}$ being formed from the vector summation of voltages $V_C$ and $(-)V_B$. It will be noted that voltage $V_{P1}$ is 90° out of phase with voltage $V_A$. In like manner, FIG. 8B is a phasor diagram which illustrates the induced poloidal voltage $V_{P2}$ being formed from the vector summation of voltages $V_A$ and $(-)V_C$. FIG. 8C is a phasor diagram which illustrates the induced poloidal voltage $V_{P3}$ being formed from the vector summation $(-)V_A$ and $V_B$.

In summary, there has been disclosed new and improved rotating flux transformers which have at least two mutually intersecting tori. Each tori includes a shorted poloidal winding comprising a plurality of shorted coils, each of which are surrounded by a magnetic subcore. The poloidal winding, being shorted, requires no electrical leads, and thus the torus need not be broken. Breaks in the torus are to be avoided, since these breaks increase the reluctance of the flux path and would require higher excitation currents. Further, only sufficient excitation current is induced into the poloidal winding by the remaining torus or tori to saturate the associated magnetic core. Since the poloidal winding carries no load current, it is much easier to cool and breaks in the torus for cooling channels are also avoided. The 90° phase shift between the fluxes produced in a magnetic core by poloidal and toroidal windings, required to produce a rotating induction vector, is achieved in a two tori embodiment by using two alternating input voltages which are phase displaced by 90 electrical degrees. In a three tori embodiment, this result is achieved by using a three-phase voltage source.

We claim as our invention:

1. An electrical transformer, comprising:

first and second magnetic cores, each of said first and second magnetic cores being a closed loop which defines a core window, with each magnetic core having an outer surface surrounding a longitudinal axis and a continuous axially extending opening, first and second shorted poloidal windings disposed in the axially extending openings of said first and second magnetic cores, respectively, first and second toroidal primary windings disposed about the outer surfaces of said first and second magnetic cores, respectively, first and second sources of alternating potential connected to said first and second toroidal primary windings, respectively, with said first and second sources of alterating potential having like frequencies which are phase displaced by about 90 electrical degrees, and a first toroidal secondary winding disposed in inductive relation with a selected one of said first and second toroidal primary windings, said first and second magnetic cores being linked, with each magnetic core passing through the window of the other magnetic core, to induce a voltage in each of said first and second shorted poloidal windings which is 90° out of phase with the voltages applied to the first and second toroidal primary windings, respectively, wherein the magnetic fluxes in each magnetic core due to the toroidal primary winding and shorted poloidal winding produce a rotating induction vector.

2. The electrical transformer of claim 1 wherein the first toroidal secondary winding is disposed in inductive relation with the first toroidal primary winding, and including a second toroidal secondary winding disposed in inductive relation with the second toroidal primary winding.

3. The electrical transformer of claim 2 wherein the first and second toroidal secondary windings are connected to provide a three-phase output voltage.

4. The electrical transformer of claim 1 wherein the first and second shorted poloidal windings each include a plurality of independent coils, with each independent coil being shorted.

5. The electrical transformer of claim 1 wherein the first and second magnetic cores each include a plurality of separate axially extending openings, and the first and second shorted poloidal windings each include a plurality of independent shorted coils, each disposed in one of said axially extending openings.

6. The electrical transformer of claim 1 wherein the excitation current generated in each of the first and second magnetic cores by the first and second sources of alternating potential applied to the first and second primary toroidal windings, and by the voltages induced into the first and second poloidal windings, causes the first and second magnetic cores to be saturated by the resulting rotating induction vector.

7. The electrical transformer of claim 1 wherein each of the first and second magnetic cores is formed of an amorphous alloy.

8. The electrical transformer of claim 1 wherein the first and second magnetic cores each include a plurality of subcores, with each of the subcores defining an axially extending opening, and the first and second shorted poloidal windings each include a plurality of independent shorted coils, with each independent shorted coil being disposed in an opening of a different subcore.

9. The electrical transformer of claim 8 wherein each subcore is formed of an amorphous alloy.

10. An electrical transformer, comprising:

first, second and third magnetic cores, each of said first, second and third magnetic cores being a closed loop which defines a core window, with each magnetic core having an outer surface surrounding a longitudinal axis and a continuous axially extending opening, first, second and third shorted poloidal windings disposed in the axially extending openings of said first, second and third magnetic cores, respectively, first, second and third toroidal primary windings disposed about the outer surfaces of said first, second and third magnetic cores, respectively, a three-phase source of alternating potential having first, second and third voltages connected to said first, second and third toroidal primary windings, respectively, and first, second and third toroidal secondary windings disposed in inductive relation with said first, second and third toroidal primary windings, respectively, said first, second and third magnetic cores being mutually linked, with each magnetic core passing through the windows of the other two magnetic cores, to induce a voltage in each of said first, second and third shorted poloidal windings which is 90° out of phase with the voltages applied to the first, second and third toroidal primary windings, respectively, wherein the magnetic fluxes in each magnetic core, due to the toroidal primary winding and shorted poloidal winding produce a rotating induction vector.

11. The electrical transformer of claim 10 wherein the first, second and third shorted poloidal windings each include a plurality of independent coils, with each independent coil being shorted.

12. The electrical transformer of claim 10 wherein the first, second and third magnetic cores each include a plurality of separate axially extending openings, and the first, second and third shorted poloidal windings each include a plurality of independent shorted cells each disposed in one of the separate axially extending openings.

13. The electrical transformer of claim 10 wherein the excitation current generated in each of the first, second and third magnetic cores by the first, second and third source voltages applied to the first, second and third primary toroidal windings, and by the voltages induced into the first, second and third poloidal windings, causes the first, second and third magnetic cores to be saturated by the resulting rotating induction vectors.

14. The electrical transformer of claim 10 wherein each of the first, second and third magnetic cores is formed of an amorphous alloy.

15. The electrical transformer of claim 10 wherein the first, second and third magnetic cores each include a plurality of subcores, with each subcore defining an axially extending opening, and the first, second and third shorted poloidal windings each include a plurality of independent shorted coils, with each independent shorted coil being disposed in an opening of a different subcore.

16. The electrical transformer of claim 15 wherein each subcore is formed of an amorphous alloy.

17. An electrical transformer comprising:

at least first and second magnetic cores, each of said at least first and second magnetic cores being a closed loop which defines a core window, with each magnetic core having an outer surface surrounding a longitudinal axis and a continuous axially extending opening, a shorted poloidal winding disposed in the axially extending opening of each of said at least first and second magnetic cores, a toroidal primary winding disposed about the outer surface of each of said at least first and second magnetic cores, a source of alternating potential connected to each of said at least first and second toroidal primary windings, with the sources of alternating potential having like frequencies which are phase displaced by a predetermined number of electrical degrees, at least one toroidal secondary winding disposed in inductive relation with a selected one of the toroidal primary windings, said at least first and second magnetic cores being linked with one another, with each magnetic core passing through the core window of each remaining magnetic core, to induce a voltage in each shorted poloidal winding which is 90° out of phase with the voltage applied to the associated toroidal primary winding on the same magnetic core, wherein the magnetic fluxes in each magnetic core due to the toroidal primary winding and shorted poloidal winding produce a rotating induction vector.

* * * * *